United States Patent
Kelly

[11] 3,899,384
[45] Aug. 12, 1975

[54] APPARATUS FOR MANUFACTURING A TENDON

[76] Inventor: William F. Kelly, 100 Bellaire Dr., New Orleans, La. 70124

[22] Filed: Jan. 3, 1972

[21] Appl. No.: 214,983

Related U.S. Application Data

[62] Division of Ser. No. 94,247, Dec. 2, 1970.

[52] U.S. Cl. ............... 156/433; 57/149; 118/125; 118/234; 118/405; 156/500; 425/113
[51] Int. Cl.² B29C 19/00; B29B 7/14; B65H 81/00
[58] Field of Search ........... 156/453, 244, 390, 498, 156/289, 500; 264/174; 174/42; 226/196; 74/574; 248/14, 15, 18; 57/6, 28.74, 164, 154, 149; 52/230; 117/119.4; 118/125, 234, 405, 420; 425/110, 113

[56] References Cited
UNITED STATES PATENTS

| | | | |
|---|---|---|---|
| 2,018,327 | 10/1935 | Shaw | 57/6 |
| 2,471,752 | 5/1949 | Ingmanson | 156/244 X |
| 2,874,411 | 1/1959 | Berquist | 118/405 X |
| 2,937,108 | 5/1960 | Toye | 117/119.4 |
| 3,227,786 | 1/1966 | Cohen | 264/174 X |
| 3,502,499 | 3/1970 | Coad | 117/119.4 |
| 3,513,609 | 5/1970 | Lang | 52/230 |
| 3,646,748 | 3/1972 | Lang | 117/75 X |
| 3,654,027 | 4/1972 | Middleton | 156/461 X |

*Primary Examiner*—Charles E. Van Horn
*Assistant Examiner*—David A. Simmons
*Attorney, Agent, or Firm*—Shlesinger, Arkwright, Garvey & Dinsmore

[57] ABSTRACT

This invention is a tendon for post-tensioning concrete which includes a strand of wire which is encased in a grease lubricant of predetermined thickness, the lubricant being covered by a loose-fitting plastic jacket which is in spaced relation determined by the grease thickness, to the strand of wire. The tendon is manufactured in a continuous process by passing the strand of wire through a grease applicator and then through a die sized to control grease thickness for impacting the strand with grease lubricant forming an envelope around the strand, following which the grease-encased strand is passed through an extruder having a die for applying a thermoplastic material to the outer surface of the grease envelope. The thermoplastic material is water cooled upon engagement with the grease envelope, causing the material to congeal, thus forming a continuous protective jacket around the grease envelope.

7 Claims, 7 Drawing Figures

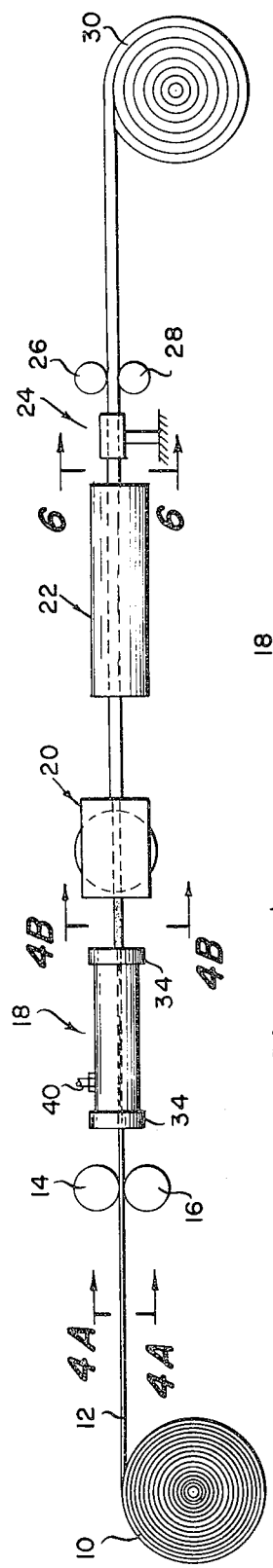
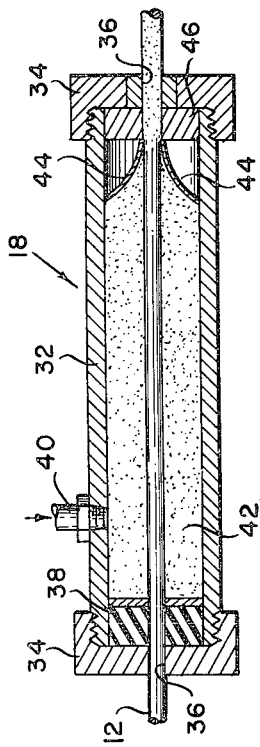

APPARATUS FOR MANUFACTURING A TENDON

This is a division of application Ser. No. 94,247, filed Dec. 2, 1970.

BACKGROUND AND OBJECTS

In the post-tensioning of pre-stressed concrete, it is conventional procedure to "jack" or tension tendons through the concrete to place the latter in compression. This is inefficient with tendons heretofore employed because of the high friction which must be overcome in "jacking" the tendon through the concrete. Attempts have been made to reduce this friction by various coatings of the wire and/or strand including a uniform tight coating of plastic material of low coefficient of friction, as shown in U.S. Pat. No. 3,513,609 granted May 26, 1970, to Frederic A. Lang. The strand is then "jacked" or tensioned through the coating. Because of the tight engagement of the coating with the wire strand, there is still a considerable amount of friction which must be overcome in carrying out the "jacking" operation.

It is an object of the present invention to provide a tendon embodying a strand of wire which is encased in a grease lubricant envelope of predetermined thickness, the grease envelope being protected by a plastic jacket covering the outer surface of the grease envelope, the plastic jacket being maintained in spaced relation to the strand of wire by the grease thickness, thereby reducing friction to a negligible amount for the purpose of "jacking" or tensioning the strand of wire through the jacket to place the concrete in compression.

Another object is to provide a process and apparatus for manufacturing a tendon embodying a lubricant-encased strand of wire surrounded by a continuous protective plastic jacket in a continuous operation, the bare strand of wire being fed through a grease lubricant applicator where a predetermined thickness of the grease lubricant is impacted on the strand of wire to form a grease envelope around the wire, following which the lubricant-encased strand of wire is fed through an extruder where a die applies a plastic jacket over the lubricant in such a manner that the plastic jacket is spaced from the strand by the grease, and is in contiguous engagement with the outer surface of the grease lubricant.

A further object is to provide a process and apparatus of the character described wherein the extruded plastic material is cooled substantially simultaneously with application to, and over, the grease lubricant which surrounds the strand, in order to prevent any breakdown of the grease or formation of gas bubbles due to the heat of the plastic jacket.

A further object is to provide a process and apparatus of the character described wherein the plastic jacket may be accurately and precisely applied to the grease lubricant by controlling the relative speeds of the feed of the plastic material and of the strand, in order to effect "necking down" of the plastic material on the grease lubricant that will provide a smooth, uniform continuous surface over the grease lubricant.

A further object is to provide a tendon of the character described wherein the lubricant envelope which is applied to the strand of wire is protected from damage by the plastic jacket, which jacket also prevents the lubricant from contaminating the concrete.

A still further object is to provide a process and apparatus of the character described wherein a strand may be lubricant-encased and jacketed uniformly to the desired thickness, in a rapid, economical continuous operation employing a minimum of parts.

Other objects will be apparent from the following description of the presently preferred form of the present invention taken in conjunction with the appended drawings.

DESCRIPTION OF THE FIGURES OF THE DRAWINGS

FIG. 1 is a schematic view illustrating the present invention;

FIG. 2 is an enlarged longitudinal sectional view of a grease applicator forming a part of the present invention;

FIG. 4A is a sectional view taken along the line 4A—4A of FIG. 1;

FIG. 4B is a sectional view taken along the line 4B—4B of FIG. 1;

DESCRIPTION OF INVENTION

Figure 3:
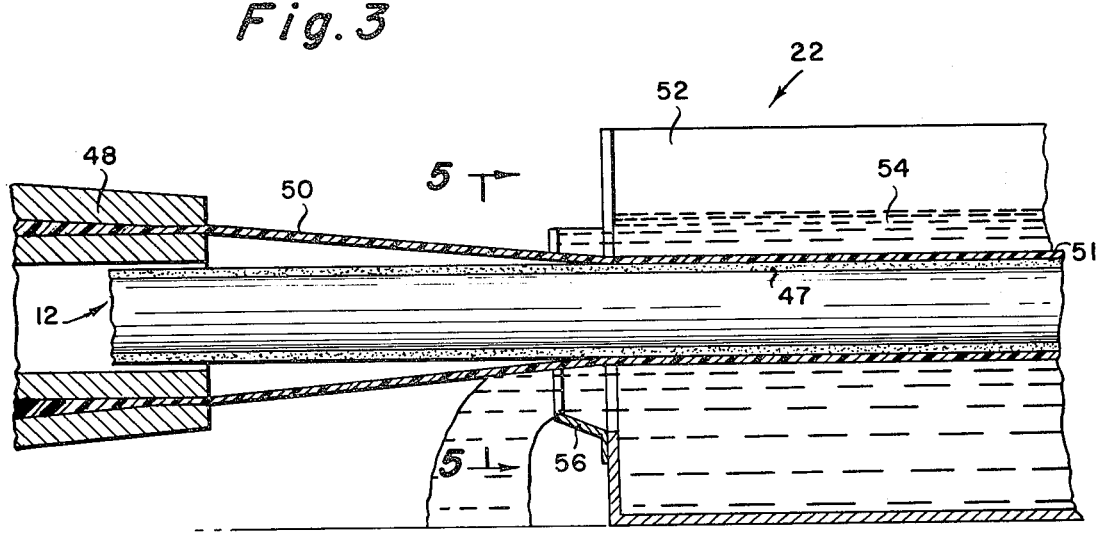
FIG. 3 is an enlarged fragmentary longitudinal sectional view showing to advantage the extruder and water bath forming a part of the present invention.
Figure 5:
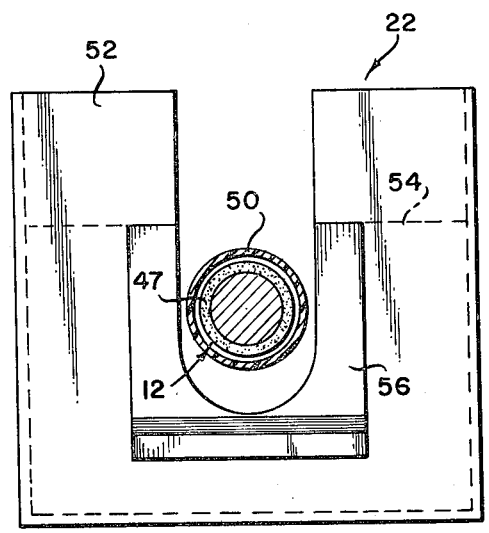
FIG. 5 is a sectional view taken along the line 5—5 of FIG. 3 looking in the direction of the arrows.

Referring now to FIG. 1, the present invention includes a reel 10 holding a roll of bare strand wire 12 of any desired diameter, which is fed between positive feed rolls 14 and 16. The wire strand is then fed in a continuous operation through a grease applicator 18, a thermoplastic material extruder 20 and a cooling station 22 to form the finished tendon. The tendon is then fed through a vibration dampener 24, between rolls 26 and 28, one of which counts the footage of completed tendon, to a take-up reel 30.

Referring now to FIG. 2, it will be seen that grease applicator 18 includes a cylindrical body 32 having end caps 34 at each end which are provided with central apertures 36 through which the strand of wire may pass. Packing is indicated at 38. A grease inlet is designated 40 through which grease 42 is admitted under pressure to the reservoir within cylindrical body 32. Grease guides are indicated at 44, the grease guides being adjacent a die 46, preferably of steel construction which gauges the thickness of the grease envelope which is applied to strand of wire 12.

The grease employed is blended for rust prevention, water rejection and/or absorption and other properties to give the strand which the grease covers long-time protection while in service, as well as short range friction reduction during tendon tensioning, or "jacking" protection against the concrete or the like from adhering to, or gaining access to the strand while the concrete is still in the plastic state before setting up. Unoba No. A-2 grease is one type that has been found to be satisfactory for the purposes of the present invention.

The strand of wire emerges from grease applicator station 18 with a grease envelope 47 of uniform thickness applied thereto, a thickness in the range of 0.015 inch to 0.020 inch having been found to give optimum results.

The lubricant-encased strand of wire is then fed through thermoplastic material extruder 20 which may be of standard construction, a Royal No. 1 extruder of 2 inch size having been found to work very successfully. Referring now to FIG. 3, it will be seen that the extruder includes a die 48 through which a thermoplastic film 50 is fed. Polypropylene copolymer is one of the plastics that has been found to be satisfactory for purposes of the present invention. The plastic film, as it leaves the die head, has a temperature of 450° to 480° F. and is approximately 0.020 inch thick.

As also shown to advantage in FIG. 3, thermoplastic film 50 is in spaced relation to the lubricant-encased strand of wire and extends towards cooling station 22 which is preferably spaced from 4 to 6 inches from the extruder.

It is a feature of the present invention that the plastic film is fed from the extruder at a rate of speed which is slightly less than that of the lubricant-encased strand, in order to effect a "necking down" of the plastic film on the lubricant to form a protective jacket 51. It is further a salient feature of the present invention to provide a water trough 22 adjacent extruder 18 for substantially simultaneous cooling of the thermoplastic material as it is applied to grease envelope 47, to prevent breakdown of the grease under the heat of the plastic or the forming of gas bubbles. Cooling station 22 includes a trough 52 to which water 54 is continually added. At the extruder end thereof, the end wall of trough 52 is provided with a throat 56 which permits the water to run from the main portion of the trough through the throat and into cooling engagement with the thermoplastic film 50 just prior to engagement with grease envelope 47, thereby causing the plastic to congeal upon engagement with the grease, and preventing any breakdown of the grease or formation of gas bubbles by contact with the hot thermoplastic film. The grease lubricant envelope on the strand provides a form on which the plastic film is placed, resulting in a continuous uniform jacket which prevents concrete or other foreign materials from passing through to the grease and conversely prevents the grease from contacting the concrete or other materials. The plastic jacket is in spaced relation to strand 12, by virtue of the thickness of the grease lubricant, the spacing being in the range of 0.015 inches to 0.020 inches, the thickness of the grease lubricant.

Figure 6:
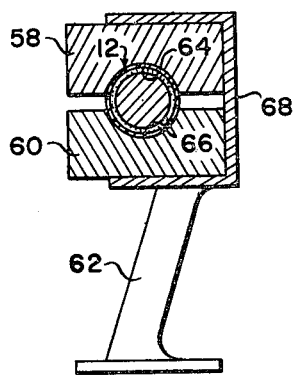
FIG. 6 is an enlarged sectional view taken along the line 6—6 of FIG. 1, looking in the direction of the arrows.

In order to minimize vibration of the tendon as it emerges from cooling station 22, vibration dampener 24 is located between the cooling station and footage counting rolls 26 and 28. As shown to advantage in FIG. 6, vibration dampener 24 includes a pair of like blocks 58 and 60 which are disposed in superimposed relationship to each other, and supported by a stationary support member 62. Blocks 58 and 60 are provided with opposed longitudinal grooves 64 and 66 which are adapted to receive the tendon for minimizing vibration of the tendon prior to passage between rolls 26 and 28. A clamp 68 of conventional construction maintains blocks 58 and 60 in opposed, contiguous relationship, which clamp may be removed for disassembly of the vibration dampener.

OPERATION

In accordance with the process and apparatus of the present invention, wire strand of ⅜ inch diameter, ½ inch diameter, or other suitable size, is fed from feed roll 10 between positive feed rolls 14 and 16 into grease applicator 18 where a grease lubricant is impacted on the strand, the strand and grease moving through a die 46 which is slightly larger in diameter than the diameter of the strand of wire, so that the wire strand emerges surrounded by a grease envelope 47 of approximately 0.015 inches to 0.02 inches in thickness. The grease-encased strand is then fed through extruder 20 at a constant rate of speed where a die 48 extrudes a thermoplastic film 50 which is in spaced relation to the grease-encased strand. The thermoplastic film is fed at a rate of speed which is slightly slower than the speed of the strand of wire, thereby effecting a "necking down" of the thermoplastic material on the grease envelope.

In order to prevent the breaking down of the grease or forming of gas bubbles by contact with the heated thermoplastic film, which emerges from the extruder at a temperature between 450° and 480° F., the strand and thermoplastic film are fed towards a cooling station where a water trough 52 feeds water into engagement with the hot thermoplastic film just prior to engagement of the plastic material with the grease. This causes the thermoplastic film to congeal around the outer periphery of the grease envelope to produce a uniform protective jacket 51 for the grease-encased strand, which jacket is in spaced relation to the strand by virtue of the thickness of the grease lubricant.

The cooled tendon is then fed through vibration dampener 24 to minimize any vibration of the tendon, following which it is fed between rolls 26 and 28 where the footage of tendon is counted preparatory to being rolled onto take-up reel 30 for storage.

With the process and apparatus of the present invention, a simple, economic, continuous and rapid means is provided for manufacturing a tendon which is adapted for use in the post-tensioning of pre-stressed concrete. This tendon, when encased in a concrete installation, enables strand 12 to be "jacked" or tensioned through jacket 51 with only the negligible friction offered by the grease lubricant.

The grease lubricant envelope which is applied to the strand of wire is protected from damage by the plastic jacket which prevents contamination of the grease lubricant by concrete or other foreign material. Conversely, the plastic jacket also prevents the lubricant from contaminating the concrete.

The present invention provides simple, continuous and economic means for manufacturing a tendon for use in the post-tensioning of prestressed concrete, manufacture being carried out in a continuous line process with minimum need for specially constructed equipment.

While there has been herein shown and described the presently preferred form of the present invention, it is to be understood that such has been done for purposes of illustration, and that various changes may be made therein within the scope of the appended claims.

What I claim is:

1. Apparatus for manufacturing a tendon embodying a strand of wire encased in a lubricant covered by a protective jacket for use in the post-tensioning of pre-stressed concrete, said apparatus including:
   a. feed means for advancing the strand of wire at a constant, predetermined speed,
   b. means for applying a lubricant of grease-like consistency and predetermined thickness to the periphery of said strand of wire, c. said means comprising an elongated housing providing a lubricant reservoir,
d. means for forcing lubricant under pressure into the reservoir,
e. inlet and outlet means at opposite ends of said housing for passing the strand of wire longitudinally through the reservoir, whereby the lubricant adheres to the outer periphery thereof,
f. die means within said housing adjacent said outlet means for gauging a lubricant envelope of uniform predetermined thickness to the strand of wire prior to passing from said housing,
g. guide means within said housing reservoir adjacent said die means for urging the lubricant in the direction of the strand of wire, and
h. means for applying a protective jacket to the outer periphery of the lubricant envelope in spaced relation to the strand of wire.

2. The apparatus of claim 1, wherein:
a. said guide means include guide members positioned within said lubricant reservoir and extending inwardly and longitudinally thereof from a point along the inner periphery of said housing intermediate the length thereof to a point proximate the strand of wire and adjacent said die means.

3. The apparatus of claim 1, wherein:
a. said means for applying a jacketing material to the lubricant envelope includes a plastic extruder through which the lubricant-encased wire passes, and
b. means for directing a plastic film towards the strand of wire at a speed less than the speed of the strand of wire, whereby "necking down" of the plastic film on the lubricant envelope is effected.

4. The apparatus of claim 3, with the addition of:
a. a cooling station embodying a water trough through which the tendon passes,
b. said trough including means for directing water on the plastic film substantially simultaneous with engagement with the lubricant envelope, to prevent breakdown of the lubricant.

5. The apparatus of claim 4, wherein:
a. said trough includes a main body portion, and
b. a throat at one end of said trough in communication with said main body portion, whereby water is permitted to run from the main portion of the trough through the throat into cooling engagement with the plastic film.

6. The apparatus of claim 4, with the addition of:
a. a vibration dampener for receiving the tendon from the cooling station,
b. said vibration dampener including a stationary support member,
c. superimposed block members on said support member,
d. the opposed faces of said block members being provided with opposed longitudinal recesses through which the strand of wire extends, and
e. means for clamping said block members together and to said support member.

7. The apparatus of claim 6, with the addition of:
a. means for collecting the tendon for storage.

* * * * *